(12) United States Patent
Camilleri

(10) Patent No.: US 9,476,742 B2
(45) Date of Patent: *Oct. 25, 2016

(54) SYSTEM, METHOD, AND COMPUTER READABLE MEDIUM FOR CALCULATING WELL FLOW RATES PRODUCED WITH ELECTRICAL SUBMERSIBLE PUMPS

(71) Applicant: Schlumberger Technology Corporation, Sugar Land, TX (US)

(72) Inventor: Lawrence Anthony Patrick Camilleri, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 26 days.

This patent is subject to a terminal disclaimer.

(21) Appl. No.: 13/958,598

(22) Filed: Aug. 4, 2013

(65) Prior Publication Data

US 2013/0317762 A1 Nov. 28, 2013

Related U.S. Application Data

(63) Continuation of application No. 12/908,702, filed on Oct. 20, 2010, now Pat. No. 8,527,219.

(60) Provisional application No. 61/373,129, filed on Aug. 12, 2010, provisional application No. 61/253,662, filed on Oct. 21, 2009.

(51) Int. Cl.
*G01F 1/34* (2006.01)

(52) U.S. Cl.
CPC ........................................ *G01F 1/34* (2013.01)

(58) Field of Classification Search
CPC .......................................................... G01F 1/34

USPC .......... 702/6, 9, 11, 12, 33, 45, 50, 100, 114
See application file for complete search history.

(56) References Cited

U.S. PATENT DOCUMENTS

| 4,821,580 | A |   | 4/1989  | Jorritsma |        |
|-----------|---|---|---------|-----------|--------|
| 5,353,646 | A |   | 10/1994 | Kolpak    |        |
| 5,466,127 | A | * | 11/1995 | Arnswald  | 417/38 |
| 5,668,420 | A |   | 9/1997  | Lin et al.|        |

(Continued)

FOREIGN PATENT DOCUMENTS

| RU | 2368772     | 9/2009 |
|----|-------------|--------|
| WO | 2008/069695 | 6/2008 |

OTHER PUBLICATIONS

Camillery et al., "First Installation of Five ESPs Offshore Romania—A Case Study and Lesson Learned" Petrom_ESP, Apr. 29-May 1, 2009, pp. 1-22.*

(Continued)

*Primary Examiner* — John Breene
*Assistant Examiner* — Yaritza H Perez Bermudez
(74) *Attorney, Agent, or Firm* — Michael Stonebrook

(57) ABSTRACT

A system, method, and computer readable medium for calculating well flow rates produced with electrical submersible pumps using measured voltage, current, frequency and pressure data. An efficiency to flow rate ratio is calculated from the voltage, current, and pressure data. The efficiency to flow rate ratio is used to obtain a non-dimensional flow rate. The flow rate through the electrical submersible pump is calculated from the non-dimensional flow rate.

11 Claims, 8 Drawing Sheets

(56) References Cited

U.S. PATENT DOCUMENTS

| | | |
|---|---|---|
| 7,117,120 B2 | 10/2006 | Beck et al. |
| 7,258,164 B2 | 8/2007 | Rezgui et al. |
| 7,562,723 B2 | 7/2009 | Reitsma |
| 2004/0064292 A1 | 4/2004 | Beck et al. |
| 2005/0031443 A1* | 2/2005 | Ohlsson et al. ............... 415/30 |
| 2005/0216229 A1 | 9/2005 | Huang et al. |
| 2006/0052903 A1 | 3/2006 | Bassett |
| 2007/0150113 A1 | 6/2007 | Wang et al. |
| 2007/0221173 A1* | 9/2007 | Hazama ........................ 123/458 |
| 2008/0067116 A1 | 3/2008 | Anderson et al. |
| 2008/0260540 A1* | 10/2008 | Koehl ........................... 417/44.2 |
| 2009/0000789 A1* | 1/2009 | Leuthen et al. ............... 166/369 |
| 2009/0044938 A1 | 2/2009 | Crossley et al. |
| 2009/0173166 A1 | 7/2009 | Genosar |
| 2009/0223662 A1 | 9/2009 | Shaw et al. |
| 2011/0106452 A1 | 5/2011 | Anderson et al. |

OTHER PUBLICATIONS

Decision on grant for the equivalent Russian patent application No. 2012120705 issued on Nov. 21, 2013.

Camilleri, et al., "First Installation of Five ESPs Offshore Romania—A Case Study and Lesson Leaned," ESP paper Lawrence 2010 SPE 127593.

* cited by examiner

SYSTEM, METHOD, AND COMPUTER READABLE MEDIUM FOR CALCULATING WELL FLOW RATES PRODUCED WITH ELECTRICAL SUBMERSIBLE PUMPS

CROSS REFERENCE TO RELATED APPLICATIONS

This application is a continuation application of U.S. patent application Ser. No. 12/908,702, filed Oct. 20, 2010 which relates to and claims priority to U.S. Provisional Application Ser. No. 61/253,662 filed on Oct. 21, 2009 and U.S. Provisional Application Ser. No. 61/373,129 filed on Aug. 12, 2010, which are incorporated by reference herein in entirety.

TECHNICAL FIELD

The present disclosure relates to monitoring downhole and surface well activities. More specifically, the present disclosure relates to systems and methods for characterizing and calculating flow rates in wells that are produced with electrical submersible pumps.

BACKGROUND

In the oil industry, wells are often equipped with permanent gauges. Supervisory control and data acquisition (SCADA) systems are also currently used in wells to achieve reduced operating cost and increased recovery factors. As an example, more than 11,000 electrical submersible pumps (ESP) from Schlumberger have been fitted with gauges over the past six years and over 1,000 of these wells have remote monitoring capability using a SCADA system. Despite the large deployment of instrumentation and connectivity, the ability to measure flow rates in real time has lagged and generally remains manual and episodic in nature. Wells are in most cases tested once per month with flow rate measurements entered manually into production databases.

The most common technique used for flow rate measurements uses a test separator which is a vessel into which production is diverted for measurement of the oil, water and gas flow rate of a well. Tests are usually performed on a monthly basis but in many cases the frequency is even less due to logistical reasons. One downside of the use of current test separators is that many wells produce at flow rates below the threshold required to achieve reasonable accuracy. Additionally, flow rate measurement techniques using test separators do not provide the testing frequency, repeatability, or resolution required to create an accurate log of flow rates over time.

Previous attempts to monitor well flow rate in wells with ESPs using downhole gauge data have been made using a differential pressure across the pump and a pump head versus flow curve. This method, while valid in many applications, requires NODAL™ (available from Schlumberger) analysis to calculate an average specific gravity through the pump to convert the measured differential pressure into a differential head. The technique is therefore only valid when steady state conditions apply as this is a prerequisite for NODAL™ analysis. It is also difficult to apply this technique when the gas void fraction (GVF) through the pump is high as this can cause slugging, which means that the well is no longer in steady state.

BRIEF DISCLOSURE

A method of determining flow rates for a well produced with an electric submersible pump (ESP) is disclosed herein. Electrical power is applied to an ESP and controlled with surface switchgear. A processor receives intake and discharge pressures from either a single or two gauges installed in the well. The processor receives a voltage and a current. The processor further receives at least one static value. The processor calculates an efficiency to flow rate ratio by applying the received voltage and current to a power equilibrium equation. The processor obtains a non-dimensional flow rate by applying the calculated efficiency to flow rate ratio to the static data. The processor calculates the flow rate from the non-dimensional flow rate. The processor creates a log of calculated flow rates.

An embodiment of a system for monitoring the flow rate of liquid in a well includes an electric submersible pump (ESP) positioned within a well completion. A surface switchgear is electrically coupled to the ESP and the surface switchgear provides electricity to drive the ESP. An intake pressure gauge is coupled to the ESP and measures the ESP's intake pressure. A discharge pressure gauge is coupled to the ESP and measures the ESP's discharge pressure. A volt-meter is coupled to the surface switchgear and measures a voltage provided to the ESP. An ammeter is coupled to the surface switchgear and measures the current absorbed (or drawn) by the ESPs motor. A surface switchgear controls a supply of power at a known and/or measured frequency. A processor executes computer readable code stored on a computer readable medium that upon execution causes the processor to carry out tasks. The processor receives the measured intake pressure, discharge pressure, voltage, current, and frequency. The processor calculates a flow rate through the ESP by applying the received values to a power equilibrium equation based upon the ESP.

A computer readable medium disclosed herein causes a processor to periodically receive a voltage, a current, a frequency, intake pressure, and a discharge pressure. The processor calculates an efficiency to flow rate ratio by applying the received voltage, current, frequency, intake pressure, and discharge pressure to a non-dimensionalized power equilibrium equation. The processor obtains a non-dimensional flow rate by relating the efficiency to flow rate ratio to a received pump characteristic. The processor calculates a flow rate from the non-dimensional flow rate. The processor creates a log of calculated flow rates.

DETAILED DISCLOSURE

The following description concerns a number of embodiments and is meant to provide an understanding of the embodiments. The description is not in any way meant to limit the scope of any present or subsequent related claims.

As used herein, the terms "above" and "below"; "up" and "down"; "upper" and "lower"; "upwardly" and "downwardly"; and other like terms indicating relative positions above or below a given point or element are used in this description to more clearly describe the embodiments. However, when applied to equipment and methods for use in wells that are deviated or horizontal, such terms may refer to a left to right, right to left, or diagonal relationship as appropriate.

Figure 1:
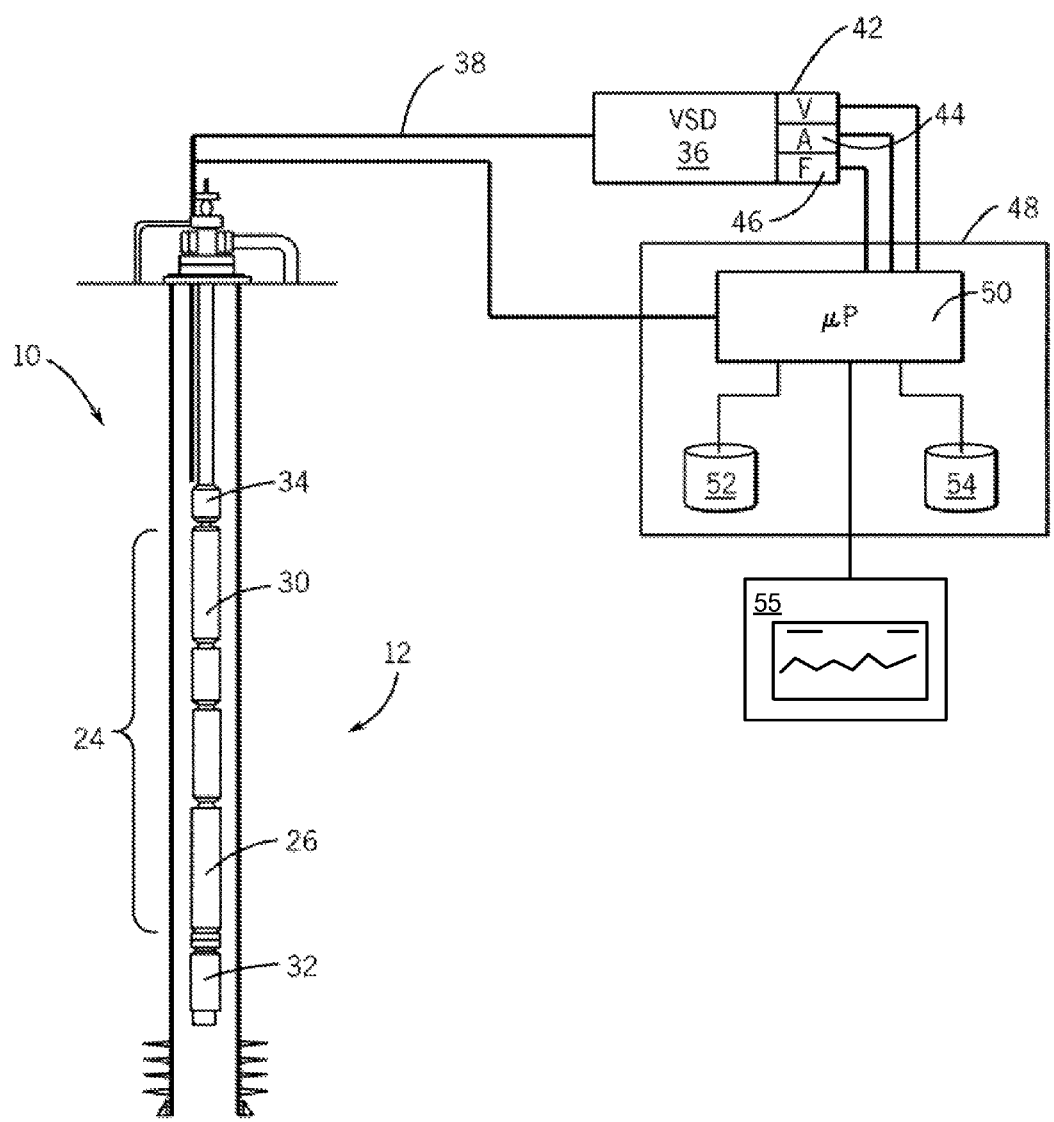
FIG. 1 is a system diagram of an oil well completion produced with an ESP.

FIG. 1 depicts one example of a completion 10 within a well bore 12. The completion 10 incorporates an electric submersible pump (ESP) 24. There are many examples of possible well completion architectures which incorporate various other downhole tools such as packers, by-pass tubing and ESP encapsulation, which are a few such tools. The presently disclosed systems and methods are independent of the completion architecture used in the specific application outside of the use of an ESP. While the disclosure of the system and method herein is focused on hydrocarbon wells, it is understood that embodiments may be used for any type of liquid being pumped with an ESP. Non-limiting examples include: hydrocarbons from an oil well, water from a water well, water from a geothermal well, water from a gas well, or hydrocarbons from a sump. In the case of an oil well, an ESP 24 may be deployed in the completion 10 in order to improve production of hydrocarbons.

The ESP 24 includes a motor 26 and a pump 30. The motor 26 operates to drive the pump 30 in order to increase hydrocarbon production to the surface. The ESP 24 further includes an intake pressure gauge 32, this may be an integral part of the ESP 24 or be a separate device. The intake pressure gauge 32 may be a part of a multisensory unit that includes a variety of sensors such as may be recognized by one of ordinary skill in the art. The intake pressure gauge 32 measures the pressure upstream of the ESP 24. The ESP 24 further includes a discharge pressure gauge 34, which may be an integral part of the ESP 24, or may be a separate device. The discharge pressure gauge 34 measures the pressure downstream of the ESP 24. While this description has been of pressure gauges that are permanent components of the pipe string with the ESP, it is to be understood that in other embodiments, a memory pressure gauge may be used. With a memory pressure gauge, the pressure gauge is installed temporarily within the completion and the gauge records the measured pressure to a computer readable medium, which is either within the gauge or at the surface. After a time interval, exemplarily one month, the memory pressure gauge is removed from the well and the measured pressure data is uploaded to a computer system for processing. In some embodiments, temperature sensors (not depicted) are included in the ESP 24 or as part of a multisensory unit. The temperature sensors measure the temperature of the hydrocarbons at an intake of the ESP and also measure the temperature of the motor 26.

The motor 26 of the ESP 24 receives electrical energization from a switchgear 36 typically located at the surface, outside of the well completion. The switchgear 36 controls the power to the motor 26, which is provided by a generator or utility connection (not depicted), as would be recognized by one of ordinary skill. In the embodiment depicted, the switchgear is a variable speed driver (VSD) 36; however, this is not intended to be limiting on the scope of switchgear that may be used in alternative embodiments. The VSD 36 delivers energization to the ESP 24 through an electrical conduit 38. The VSD 36 is either connected to or includes a variety of sensors for monitoring conditions of the VSD 36. In one embodiment, the VSD 36 includes a voltmeter 42, an ammeter 44, and a frequency transducer 46. These three devices all measure operational characteristics of the VSD 36, namely, the voltage, the current, and the frequency, respectively. These sensors can monitor the operational characteristics of the VSD 36 at any of a number of available refresh rates. It is understood that alternatively, the VSD 36 may not include its own voltmeter, ammeter and frequency transducer. In that case, separate surface transducers 42, 44, and 46 would be required. In a still further embodiment, one or more of the values of voltage, and frequency are provided to the VSD 36 by a technician as operational inputs. The VSD then operates to provide electrical energization at these characteristics.

The monitored operational data is sent from the VSD 36 to an integrated surface panel (ISP) 48 for further processing. The ISP 48 is also communicatively connected to the intake pressure gauge 32 and to the discharge pressure gauge 34. The ISP receives the monitored intake pressure from the intake pressure gauge 32 and the discharge pressure from the discharge pressure gauge 34. While in some embodiments, the ISP 48 may receive the five analog signals (intake pressure, discharge pressure, voltage, current, and frequency) in real time or near-real time, in alternative embodiments the processor may receive the analogue data from memory gauges that incorporate a buffer or other time delay. Both methods are applicable and are not intended to be limiting to the scope of this disclosure. Furthermore, the data refresh rate can vary widely from intervals of seconds to months. In one embodiment a measured value is received by the ISP 48 every day, hour, or minute; however these refresh rates are merely exemplary and are not intended to be limiting on the scope of this disclosure.

The ISP 48 includes a processor 50 that is communicatively connected to a computer readable medium 52 programmed with computer readable code that upon execution by the processor 50 causes the processor 50 to perform the functions as disclosed in further detail herein. The ISP 48 further comprises a computer readable medium that operates as a database 54. The processor 50 stores the data received and calculated by the processor 50 in the database 54. The processor 50 can control a graphical display 55 (e.g., a visual display device), for example, to present a graph of the log of calculated values and, for example, a graph that presents a qualitative analysis of a flow rate trend of the flow rate through an electric submersible pump (ESP).

ISP 48 transmits the recorded and processed data to one or more remote locations. The transmission of the recorded and processed data may be performed using wired or wireless communication platforms such as local intranet communication, radio frequency (RF) transmission, or satellite transmission. However, in some situations, there is no data transmission and the user downloads the data manually from the ISP memory to portable storage for entry into the processor. Also in other situations, the processor can be located at the wellsite. Data transmission is merely exemplary and not intended to be limiting the scope of this disclosure It is to be understood to one of ordinary skill in the art that the communication and processing components of this system may be arranged in a wide range of configurations while being within the scope of the present disclosure. In one such configuration, the processor 50 is not integrated with the ISP 48, but is rather connected locally by a wired or wireless data connection. In such an embodiment, the processor 50 may be a laptop computer (not depicted) used by a well operator that establishes a data connection with the ISP 48. The laptop computer may include the computer readable mediums 52 and 54. In an alternative configuration, the ISP 48 transmits the measured values remote computer or server through a wired, wireless, or satellite data connection. Therefore, the processor 50 and computer readable mediums 52 and 54 would be located remotely from the ISP 48. In either of these embodiments, the ISP 48 performs a function more akin to a data router that receives the periodically measured values and processes them to the extent necessary for transmission to the processor 50.

Figure 2:
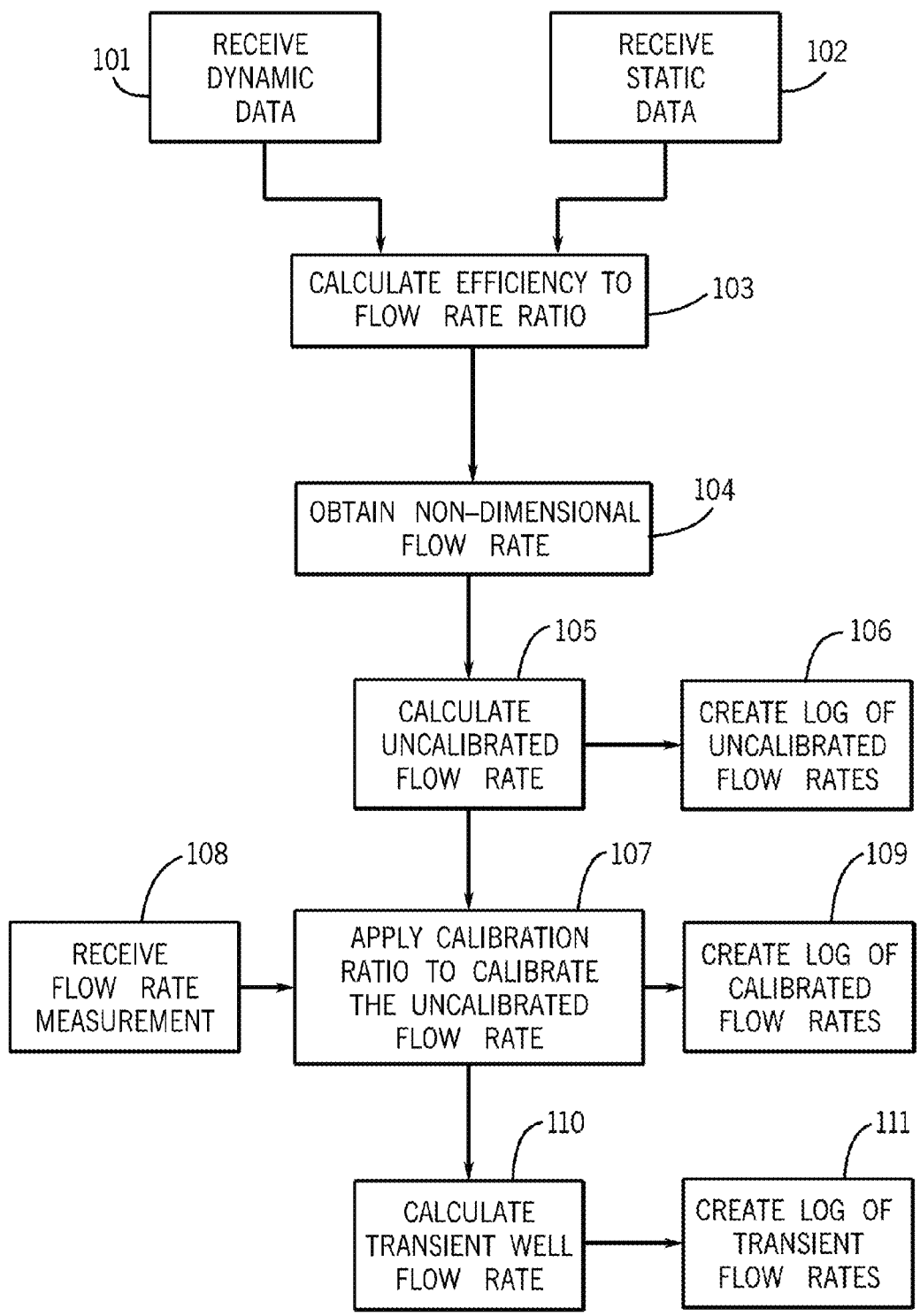
FIG. 2 is a flow chart depicting an embodiment of a method of obtaining flow rates for a well produced with an electrical submersible pump.

FIG. 2 is a flow chart depicting an embodiment of a method 100 of determining flow rates of a well completion with an ESP. The method 100 may be embodied in computer readable code on the computer readable medium 52 such that when the processor 50 executes the computer readable code, the processor 50 executes the method 100.

In the method 100, two types of data are received: dynamic data, which are measured values that vary over time, and static data that are time independent pieces of information. At 101 dynamic data is received. This dynamic data includes an intake pressure from the intake pressure gauge 32 and a discharge pressure from the discharge pressure gauge 34. The dynamic data further includes a voltage, a current, and a frequency as monitored by the respective sensors of the surface switchgear 40. In some cases, it may also include the power factor if such a transducer is fitted to the switchgear. The dynamic data are periodically sampled, but different values may be sampled at a variety of rates.

At 102, static data is received. The static data includes identifications or physical characteristics of components of the well. The static data includes information on the length and a type of electrical cable used in the well, a transformer ratio, and a pump type. Data such as the transformer ratio may be used directly in calculations. Data such as the length and type of electrical cable can be used to derive a value that is used in calculations. However, other types of static data, such as pump type, allow for the selection of a number of values representing characteristics of the identified component. Therefore, from a piece of static data such as pump type a value such as "flow rate at best efficiency point" ($Q_{BEP}$) and "initial pump efficiency" ($\eta_p$) as a function of flowrate may be obtained. These characteristic values are stored in a lookup table and therefore may be readily accessed by a processor once the pump type is identified.

Next, at 103, the ratio of efficiency to flow rate is calculated using equation (6) and the dynamic data and the static data, as is disclosed in further detail herein.

The derivation of equation (6), which is used above to calculate a ratio of pump efficiency to flow rate, will be explained in further detail herein. This algorithm begins with the design of the ESP itself, such that the power absorbed by the pump 30 is equal to the power consumed by the motor 26. This relationship can be expressed as the power equilibrium at the shaft between the pump and the motor in equation (1). This is based on the principle that the torque and speed of the pump and motor are equal at all times in an ESP.

$$\frac{\Delta P \times Q_p}{58847 \times \eta_p} = \frac{V_m \times I \times PF \times \eta_m \times \sqrt{3}}{746} \quad (1)$$

In the above equation, the following variables are used:

ΔP Differential Pressure ($P_d$-$P_i$) across the ESP in psi.

$\eta_p$ Pump Efficiency. In initial calculations, the pump can be assumed to be new and the pump efficiency is determined from the pump type. Later, as the pump wears, pump efficiency can be part of the flow rate calibration.

I The Motor Current in Amps from an ammeter of the surface switchgear. Current must be compensated by the transformer ratio to obtain downhole current, when a transformer is located between the motor and the ammeter.

$V_m$ Motor Voltage in volts as measured by a voltmeter of the surface switchgear. Voltage must also be compensated for the power loss over the power cable from the surface to the motor. It is conceivable that in the future gauges will be developed which measure downhole motor voltage directly and compensation will be measured directly without requiring compensation for cable losses.

Figure 8:
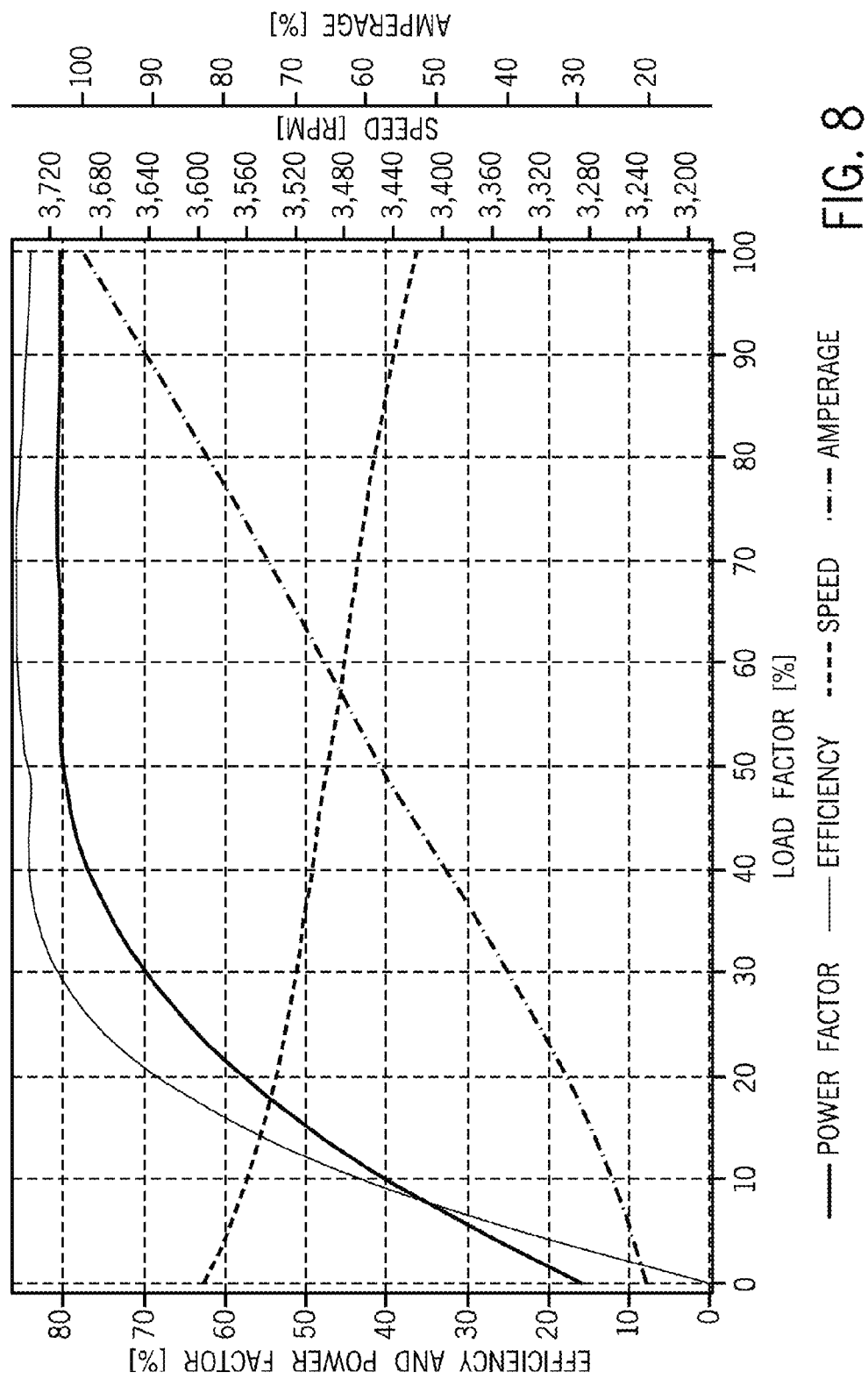
FIG. 8 is a graph depicting exemplary power factor, efficiency, speed, and amperage performance curves for a variably rated motor.

$\eta_m$ For most modern motors, efficiency can be considered a constant across a wide range of load factors as shown by FIG. 8. The equations below are based on this assumption; however where previous generation motors are used, an additional algorithm can be programmed to calculate the motor efficiency as a function of motor load e.g. current, frequency and voltage. Furthermore, if the load factor is less than 50%, an algorithm can be added to calculate the efficiency as a function of measured voltage, current and frequency.

PF Motor Power Factor. In modern motors, the power factor is a constant across a wide range of load factors; however, as the motor wears, the Power Factor may vary and therefore must be calibrated over time. There are systems which allow accurate direct measurement of actual PF, in which case this would be used as opposed to assuming that the PF is constant. Both techniques are valid and are not intended to be limiting to the scope of this disclosure. Furthermore, if the load factor is less than 50%, an algorithm can be added to calculate the efficiency as a function of measured voltage, current and frequency.

For the purpose of simplifying the equations, some embodiments assume the motor efficiency and power factor are constant values, however this should not limit the disclosure.

FIG. 8 is a graph that depicts exemplary power factor, efficiency, speed, and amperage performance curves for a variably rated motor showing constant efficient and power factor for load factors between 50% and 100%. More traditional motors do not exhibit a constant power factor and efficiency across such a wide range of load factors.

It is to be recognized that while the constants of equation (1) have been established using English units, the same basic equation will work for standard or any other units, provided that the proper conversions are applied.

Using the above measurements and assumptions for equation (1), the flow rate through the pump at downhole conditions of pressure can be calculated. The calculated flow rate is actually the average flow rate through the ESP. In reality, the flow rate at the pump entry is substantially different than the discharge flow rate because of the compressibility of gas and oil. In order to obtain the surface flow rate, it is necessary to use the fluid PVT data to correct for oil and gas formation volume factors. Alternatively, one can simply calibrate against known surface well tests and then use equation (1) to quantify the relative changes.

The calculation of flow rate using solely equation (1) has advantages and disadvantages. The advantages are found from the calculation of flow rate using equation (1) is that flow rate in downhole reservoir barrels per day can be calculated without any knowledge of PVT and this provides identification of changes in flow rate as well as the stabilization time for the well. Additionally, as ESPs have low inertia, the flow rate calculated in this manner provides a representation of flow rate fluctuations or what is known as surges and transients. This is typically caused by pumping fluids with high GVF (gas void fraction) and/or starting and stopping a well. A high sampling frequency of the gauge data is required in order to capture these transients. An exemplary high sampling frequency is one measurement every minute. The flow rate calculated from equation (1) provides a flow rate versus time curve, which can be used in many ways. Exemplary uses will be described in further detail herein with respect to various embodiments, including ESP diagnostics (FIG. 4); creating a reservoir simulation model based upon a superposition theory (FIG. 5); and reservoir diagnostics (FIG. 6), however, these are not intended to be limiting on the scope of uses for embodiments of the systems and methods disclosed herein.

In order to obtain flow rate at standard conditions, it is necessary to either correct based on known PVT values or to calibrate to a known accurate well test.

Furthermore, equation (1) does not contain the frequency variable, however, flow rate is dependent upon frequency. For a fixed frequency ESP application, the motor frequency does not need to be considered. However, in settings in which a VSD is used, any frequency change needs to be taken into consideration.

Once the dynamic data are received at 101 and the static data are received at 102, all of the values for equation (1) become known, except for flow rate ($Q_p$). Equation (1) can be rearranged to obtain equation (2):

$$\frac{Q_p}{\eta} = \frac{V_m \times I \times PF \times \eta_m \times \sqrt{3}}{746} \times \frac{1}{\Delta P} \times 58847 \quad (2)$$

Equation (2) may be solved with the known values in order to solve for average flow rate through the ESP. As pump efficiency is a function of flow rate, in order to solve for flow rate, the ratio of flow rate to efficiency is calculated as a function of voltage, current, motor efficiency, power factor, and differential pressure as found in equation (2). As the flow rate ($Q_p$) to pump efficiency ($\eta_p$) ratio is a known unique function for each pump type, flow rate can therefore be calculated. Note that either the ratio of flow rate to efficiency or the ratio of efficiency to flow rate may be used to resolve the equation for flow rate. However, it is typically mathematically more convenient to use the ratio of efficiency to flowrate, which is the inverse of equation (2).

However, equations (1) and (2) do not contain the motor frequency variable. As noted above, for a fixed speed ESP application, this does not need to be considered, unless there are speed variations due to power generation. However, in embodiments in which a VSD is used, any frequency changes must be taken into consideration. The frequency component may be handled either manually, by defining a family of curves (one for each frequency) for the function $Q_p/\eta_p$ and $\eta_p/Q_p$ and then interpolating numerically for the given frequency.

Alternatively, a solution may be achieved mathematically by non-dimensionalizing the flow to efficiency ratio using values derived from the received static data. Equation (3) below is an example of a technique used for non-dimensionalizing flow that uses the flow rate at the best efficiency point ($Q_{BEP}$) which is a value that is obtained from pump type.

$$Q_p = \frac{Q_{BEP}}{2} \times (Q_n + 1) \quad (3)$$

It is to be noted that $Q_{BEP}$ is linearly proportional to the frequency, but is constant for a given pump geometry and pump frequency. Therefore, once a pump type is specified, $Q_{BEP}$ is a known value. Other methods for non-dimensionalizing the flow rate, which introduce dependency on frequency, can also be used and the proposed method in equation (3) does not limit the scope of this disclosure.

By substituting equation (3) into equation (2), a version of equation (1) that is non-dimensionalized for VSD frequency is obtained:

$$\frac{Q_n + 1}{\eta_p} = \frac{2 \times 58847 \times \sqrt{3}}{746} \times \frac{PF \times \eta_m}{\Delta P \times Q_{BEP}} \times I_m \times V_m \quad (4)$$

Two further adjustments to power equilibrium equation of equation (1) create algorithms suitable for practical use in the systems and methods as disclosed herein. The first modification is to account for energy losses in the power cable and transformer. In most applications, it is not possible to directly measure the motor voltage at the motor and therefore surface voltage ($V_s$) is obtained from the surface switchgear or the VSD. Equation (5) is an algorithm that provides this compensation. Equation (5) begins with equation (4) above, but replaces the motor voltage ($V_m$) with the surface voltage ($V_s$) and compensates the equation for the voltage losses attributable to the electrical conduit down the completion between the VSD and the motor. The line voltage losses are subtracted from the surface voltage ($V_s$), with (a) representing the electrical losses in the cable. The value of (a) is calculated based upon the length of the electrical conduit and the type of conduit, both of which may be received static data.

$$\frac{Q_n + 1}{\eta_p} = \frac{2 \times 58847 \times \sqrt{3}}{746} \times \frac{PF \times \eta_m}{\Delta P \times Q_{BEP}} \times I_m \times (V_s - a \times I_m) \quad (5)$$

The use of equation (5) makes it possible to calculate the ESP flow rate by measuring the voltage and current at the surface, rather than at the ESP motor.

Finally, as with the frequency compensation in equation (4), when the ESP receives energization from a VSD, there may be a step-up transformer interposed between the VSD and the ESP. The only data available regarding the step-up transformer is often the output voltage from the VSD, in which the case the transformer ratio needs to be accounted for in a useful algorithm. Equation (6) compensates equation (5) for the transformer ratio (R) and therefore is able to calculate ESP flow rate using the measurements of voltage and current from the VSD ($I_d, V_d$).

$$\frac{\eta_p}{Q_n+1} = \frac{746}{2 \times 58847 \times \sqrt{3}} \times \frac{\Delta P \times Q_{BEP}}{PF \times \eta_m} \times \frac{1}{I_d \times (V_d - a \times R^2 \times I_d)} \quad (6)$$

Therefore, the algorithm represented in equation (6) is a modification of the original power equilibrium equation (1) to provide a practical solution to monitoring ESP flow rate using available monitored values and received known device characteristics.

As a further matter, the flow rate as calculated by equation (6) provides an average flow rate through the ESP at in-situ conditions. This flow rate calculation is itself useful for evaluating well conditions as will be disclosed in further detail herein. However, in some settings, a user may require a calculation of stock tank flow rate. This flow rate may be obtained from the algorithm of equation (6) by further modifying the equation in one of two ways. First, PVT data may be used to convert the downhole in-situ flow rate to stock tank conditions. Alternatively, an empirical ratio based upon well tests may be used to provide the proper conversion to stock tank flow rate.

As noted above, the pump efficiency ($\eta_p$) and the motor power factor (PF) can both degrade over time due to wear and deposit buildup in the components of the ESP while the ESP is in operation. Therefore, when an ESP is first placed in the completion, the motor efficiency ($\eta_m$) and the motor power factor (PF) can be treated as constants available from the static data. Since these values may degrade over time, they can become a source of inaccuracy in the calculation of ESP flow rate. Therefore, some embodiments require periodic calibration in order to provide an accurate flow rate value. However, even uncalibrated flow rates provide accurate qualitative and flow rate trend information as the presently disclosed systems and methods provide an analytical solution to the calculation of ESP flow rate that is not dependent upon regression techniques. Since the motor efficiency ($\eta_m$) and the motor power factor (PF) are constants in the equations, any numerical inaccuracy present without calibration is only a shift in the magnitude of the calculated flow rate. Even when the algorithms are not calibrated and the calculated flow rate values are therefore inaccurate in absolute terms, the calculation provides the basis for reconstructing flow rate versus time logs which enable the determination of qualitative trends as the workflow has high repeatability and resolution with the majority of the transducers/instruments presently available within the industry.

Therefore, the solution of the system and method as disclosed herein for calculating flow rate is improved over previous flow rate inference techniques as the currently disclosed system and method performs a calculation to derive an actual flow rate from first principles rather than empirical models or fitting parameters.

Returning to the flow chart of FIG. 2, the dynamic data is received at 101 and the static data is received at 102. At 103, an efficiency to flow rate ratio is calculated by applying the dynamic data and the static data to the algorithm of equation (6). As identified above, equation (6) is the generalized equation that can be used for either fixed or variable speed applications.

Figure 3:
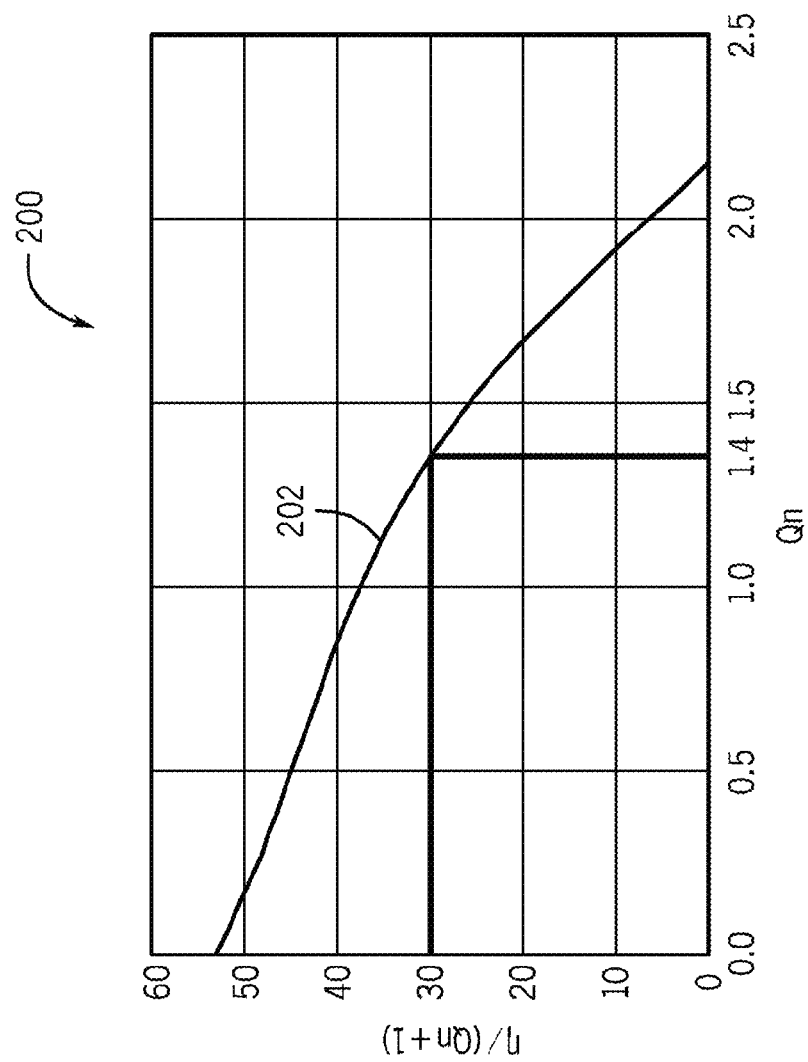
FIG. 3 is a graph depicting an exemplary relationship of the ratio of pump efficiency to flow rate versus flow rate in non-dimensional form for a particular pump

At 104, non-dimensional flow rate is obtained. Briefly referring to the graphic of FIG. 3, which depicts a graph 200 of an exemplary relationship of pump efficiency to flow rate. Each pump type (from the received static data) will have an efficiency curve which is provided by the manufacturer. The manufacturer provided efficiency curve is divided by flow rate to achieve the function 202 depicted on the graph 200. The non-dimensional flow rate is obtained at 104 by taking the calculated efficiency to flow rate ratio from 103 and finding the corresponding flow rate. In the graph 200, the efficiency to flow rate ratio is applied on the Y axis and non-dimensional flow rate ($Q_n$) is applied on the X axis. Therefore, in a purely exemplarily embodiment, at 103, the efficiency to flow rate ratio may be calculated to be 30. The corresponding valve of non-dimensional flow rate determined from the function 202 is 1.4. This exemplarily shows one way in which the non-dimensional flow rate may be obtained at 104. It is understood that this same process can be performed mathematically and the reference to FIG. 3 is explanatory reasons.

Returning back to FIG. 2, an uncalibrated flow rate is calculated at 105. The uncalibrated flow rate is calculated by applying the obtained non-dimensional flow rate from 104 into equation (3), identified above. Since equation (3) was used to modify equation (1) to include non-dimensionalized flow rate in equation (6), revised equation is also true. Non-dimensionalized flow rate is therefore inserted into equation (3) and equation (3) can be solved for the flow rate through the ESP.

As the dynamic data received at 101 varies over time, new flow rates are calculated over time as updates to the dynamic data are received, these newly calculated flow rates may be logged at 106 with respect to time. This log of uncalibrated flow rate data can provide valuable information regarding the downhole conditions. However, as noted above, the pump efficiency ($\eta_p$) and motor power factor (PF) can vary as the ESP wears and if load factor drops. Therefore, without calibration, the uncalibrated flow rate log obtained at 106 can be used reliably for qualitative analysis and trending well performance. It is to be understood that in some embodiments and under some conditions, the uncalibrated flow rate log can be accurate itself, and in an embodiment of the system and method, the uncalibrated flow rate log can produce accurate flow rate calculations.

In order to ensure that the obtained flow rate is an accurate instantaneous ESP flow rate, the equation should be calibrated at 107. The calibration at 107 uses measured flow rate data received at 108. The measured flow rate data is used to calibrate the equation to the particular condition of the ESP and other downhole conditions present in the specific application. The measured flow rate data received at 108 is obtained from a production well test, which may be performed using a test separator (or other device such as a multiphase meter) in order to produce one or more test intervals to measure flow rate directly. As noted above, a test separator test is only applied at needed intervals, typically monthly. Embodiments of the disclosed system and method enable an increase in the time interval between well tests, thereby reducing operating costs without any loss in data quality. The measured flow rate data from the well test is used at 107 to calibrate the equation using the ratio between the calculated flow rate ($Q_p$), obtained at 105 and the measured flow rate ($Q_s$) received at 108. In one embodiment, the calculated ratio is applied to equation (6) used at 103. In an alternative embodiment, the ratio is applied directly to each of the calculated non-calibrated flow rates. In some embodiments, this calibration may be used to calculate revised values for the pump efficiency ($\eta_p$). In this way, pump efficiency can be monitored as an indication of pump condition and wear.

After the equation has been calibrated at 107, calibrated flow rate through the ESP may be calculated for any newly received dynamic data. Thus, at 109, a log of the calibrated flow rates is created with respect to time. This log of calibrated flow rates over time may be used to evaluate well or completion performance as will be described in greater detail herein.

At 110, the transient well flow rate is calculated. Total flow in a well can be modeled with the equation: $Q_p=Q_r+Q_w$. In this equation, $Q_r$ is the flow rate from the reservoir into the wellbore. $Q_w$ is the wellbore flow rate. Under steady state conditions, the flow rate in the wellbore is considered to be zero and the entire flow rate is attributable to the flow rate from the reservoir. However, during transient conditions (e.g. production stops/starts), wellbore flow rate is non-zero. The value of wellbore flow rate, or transient flow rate, is calculated at 110 during times of transience.

Two equations are presented below that can be used to calculate transient flow rate. Either of these equations may be used in alternative embodiments.

$$Q_w = A \times \frac{dh}{dt} \quad (7)$$

$$Q_w = A \times \frac{d(P_i/\rho)}{dt} \quad (8)$$

In these equations, A is the cross sectional area between the tubing and casing inside diameter above the pump. The value h is ESP submergence which is the height of fluid level above the ESP in measured depth. The value $P_i$ is the pump intake pressure. The value t is time. The value $\rho$ is fluid density. After solving for one of these equations, the value of transient flow rate is known.

The transient flow rate can be replaced in the equation above in order to also calculate the reservoir flow rate $Q_r$. Reservoir flow is valuable to reservoir analysis, especially during build-up and drawdown transient analysis.

At 111, a log of the transient flow rates calculated at 111 over time is created. This log of transient flow rates over time may be used to evaluate well or completion performance as will be described in greater detail herein.

FIGS. 4-7 each depict graphs of test data that facilitate a description of various exemplary applications of the systems and methods disclosed herein. Other applications are possible, therefore the use of the calculated flow rate in these examples should not limit this disclosure.

Figure 4:
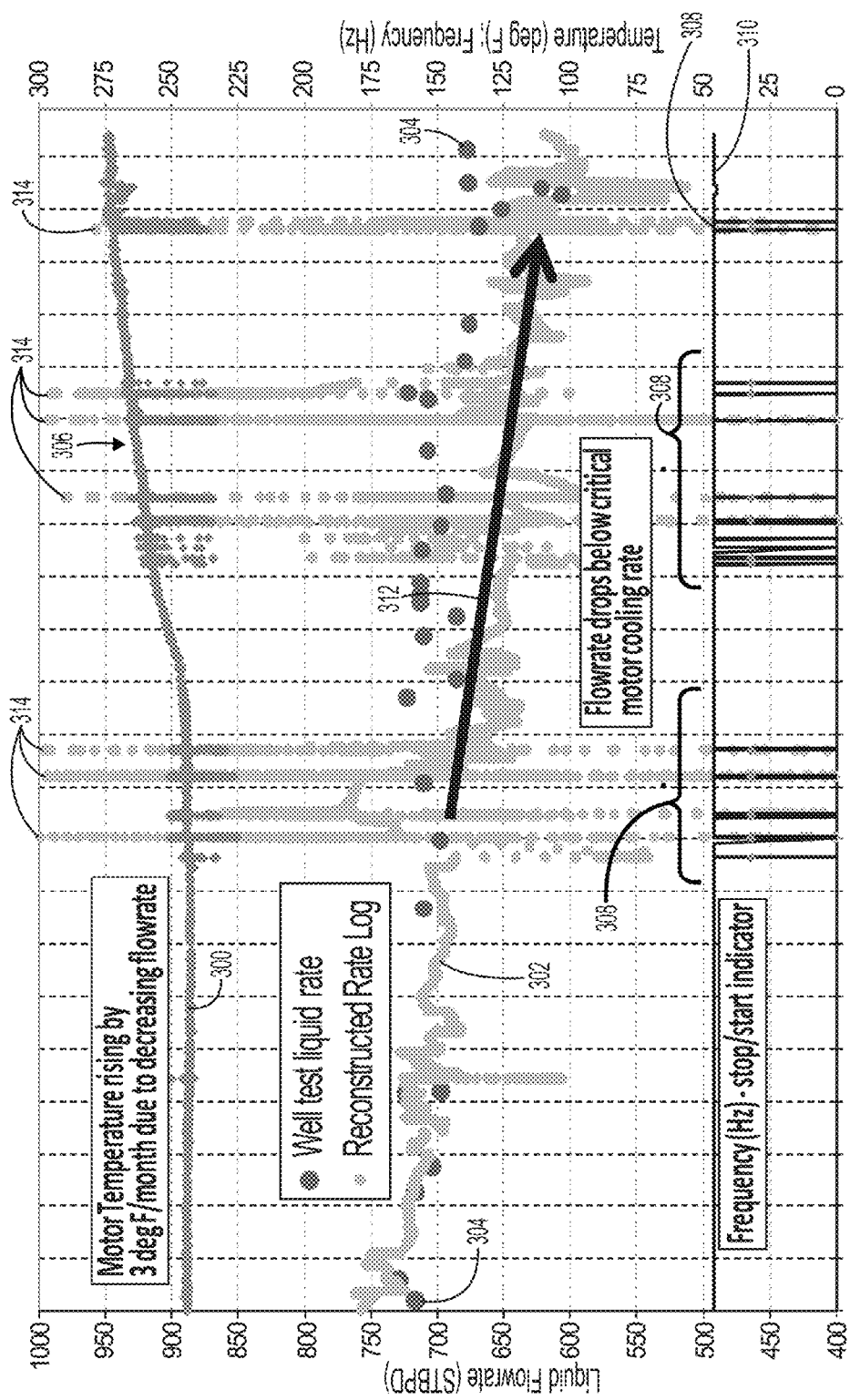
FIG. 4 is an exemplary graph of calculated flow rates.

FIG. 4 is a graph that depicts calculated ESP flow rates. Specifically, FIG. 4 graphs three values, including motor temperature 300, calculated ESP flow rates 302, and the measured ESP flow rates (of which the first and last data points are labeled 304) as measured using a test separator.

A first advantageous feature of the system and methods as disclosed herein is depicted in FIG. 4 as the motor temperature graph 300 shows a distinct increase in temperature of 30° over the course of a year. This is indicated by reference numeral 306.

It should be noted that when the motor temperature 300 is in a steady state condition, the calculated flow rate log 302 and the well test flow rate measurements 304 were in near perfect agreement. However, once a series of well shutdowns were performed at 308, as indicated by frequency graph 310, the calculated flow rate and the measured flow rate begin to diverge. The numerous shutdowns 308 cause transient conditions 314 in the well pressure and flow rates. Transients are not conducive to capturing accurate flow rate measurements using a test separator. Therefore, when the temperature of the motor began increasing, the test separator measurements of flow rate did not pick up the reduced flow rate associated with this change. However, the high resolution and repeatability of the calculated flow rate shows each of the transient conditions 314 caused by the well shutdowns as well as the downward flow rate trend 312 that coincided with the increase in motor temperature 306. A well operator viewing these results may be able to diagnose the cause of the rising motor temperature by noting the decrease in ESP flow rate. This decrease of only approximately 50 to 100 barrels per day over the course of a year was not similarly detectable with the measured test flow rates 304.

As exemplarily shown above, as a result of the high resolution achieved in the calculated ESP flow rate, the methods disclosed herein are valid in both transient as well as steady state conditions within the well. This allows for a single data processing technique to be applied to all of the data without the need to filter out time periods into transient and steady-state time periods. The ability to calculate flow rate during transient conditions allows the disclosed systems and methods to be used to monitor well hydraulic behaviors during start-ups in real time and rapidly diagnose problems.

Additionally, while accuracy requires calibration, the resolution and repeatability of the calculated flow rates are provided independently of calibration and is very high with the metrology currently available with standard ESP gauges and other electrical measurements. This enables the detection of flow rate changes as small as 1 to 10 bpd. This feature is particularly useful in low flow rate wells which are notoriously difficult to test, especially since they require long test durations. It will be recognized by one of ordinary skill that resolution changes mathematically with changes in calibration, therefore while the benefit of high resolution and high repeatability of the calculated flow rates are independent of calibration, the mathematically calculated resolution does change.

Figure 5:
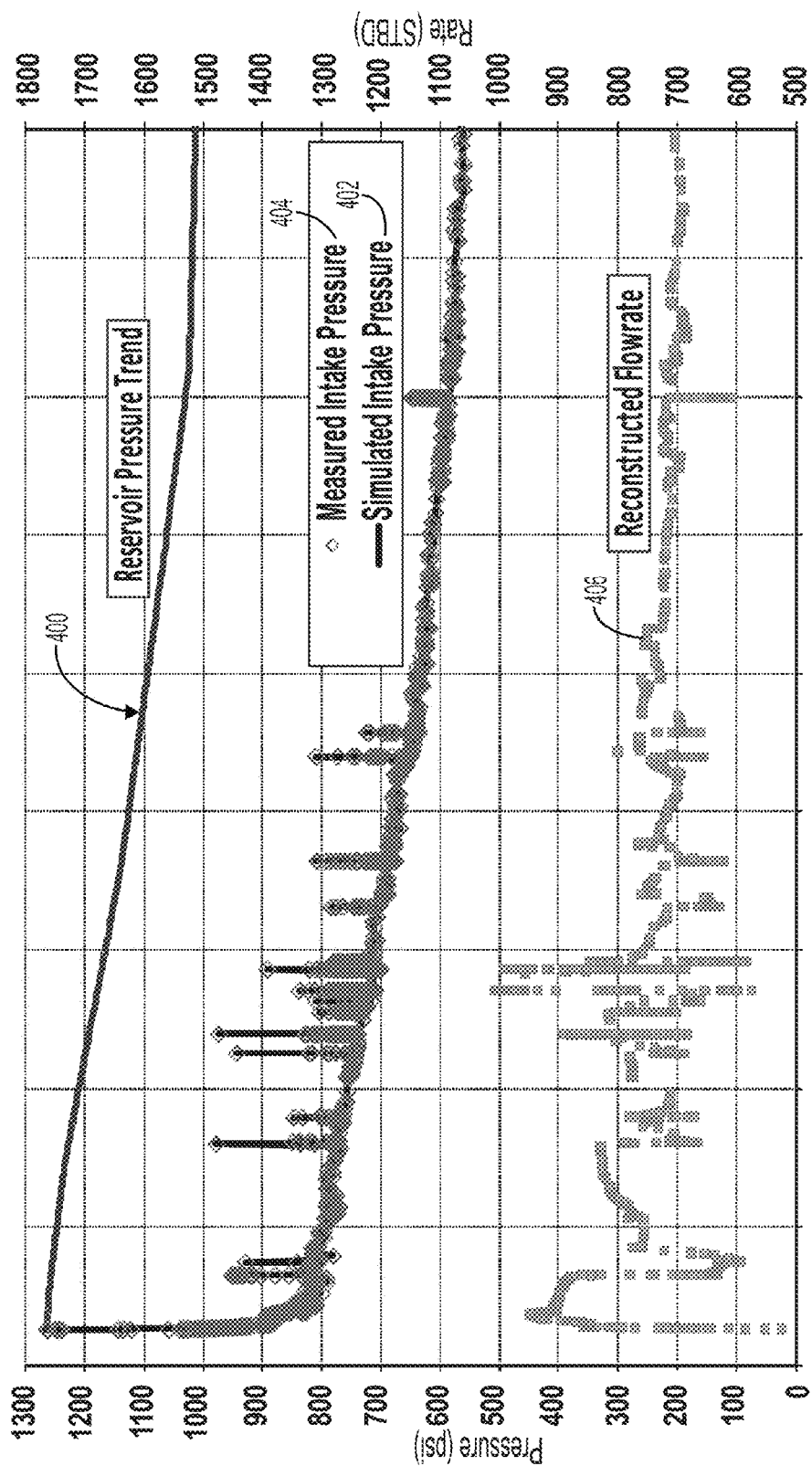
FIG. 5 is an exemplary graph depicting a reservoir pressure simulation based on calculated flow rate which provide transient history.

FIG. 5 is an exemplary graph depicting a reservoir pressure simulation. The reservoir pressure simulation is constructed using a superposition model which is a mathematical technique based upon the property that solutions to linear partial equations can be added to provide yet another solution. The reservoir pressure trend 400 shows a pressure decline in the drainage area of a well. As can be seen from the rest of the graph at FIG. 5, the simulated intake pressure 402 matches the measured intake pressure 404. The accuracy of the simulated intake pressure is achieved due to the fact that the calculated flow rate log captures the flow rate transients (as discussed above) that contribute to the declining trend. Therefore, FIG. 5 shows the accuracy that can be achieved during mathematical simulations based upon the calculated flow rate data obtained by the currently disclosed system and methods.

Figure 6:
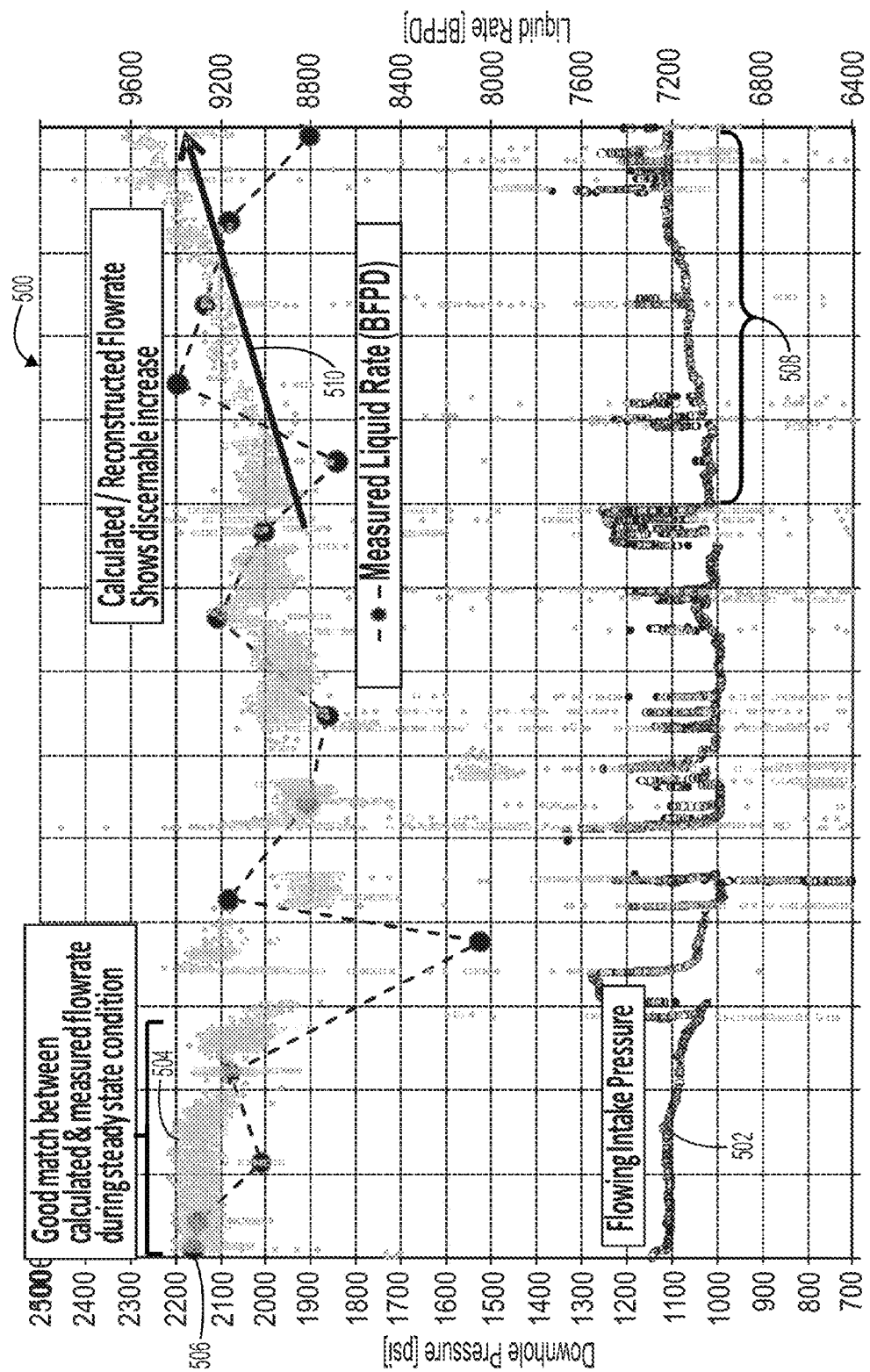
FIG. 6 is a graph depicting exemplary measured pressure and flow rate and calculated flow rate.

FIG. 6 is an exemplary graph 500 depicting measured pressure 502 and flow rates 506 and calculated flow rates 504. At the left of the graph 500, it can be noted that during the steady state condition of the intake pressure 502, the calculated flow rate log 504 and the measured ESP flow rates 506 achieve a good match between the data. However, when the downhole pressure increases by approximately 100 psi at 508, despite achieving a high accuracy of +/−5%, the resolution and repeatability of the measured flow rates is insufficient to identify the trend of increasing flow rate. On the contrary, the calculated flow rate 504 clearly exhibits the increasing trend 510 over the same time period and provides the basis for reservoir analysis and diagnostics. The identification of trends like 510 is possible due to the high resolution and repeatability of the calculated flow rate data achieved through the currently disclosed systems and methods. In an exemplary embodiment, even if the calculated flow rate log 504 were not properly calibrated to the measured ESP flow rate 506, the increasing trend 510 would still be readily identifiable from the data, despite the fact that the accuracy of calculated flow rate values may be low.

Figure 7:
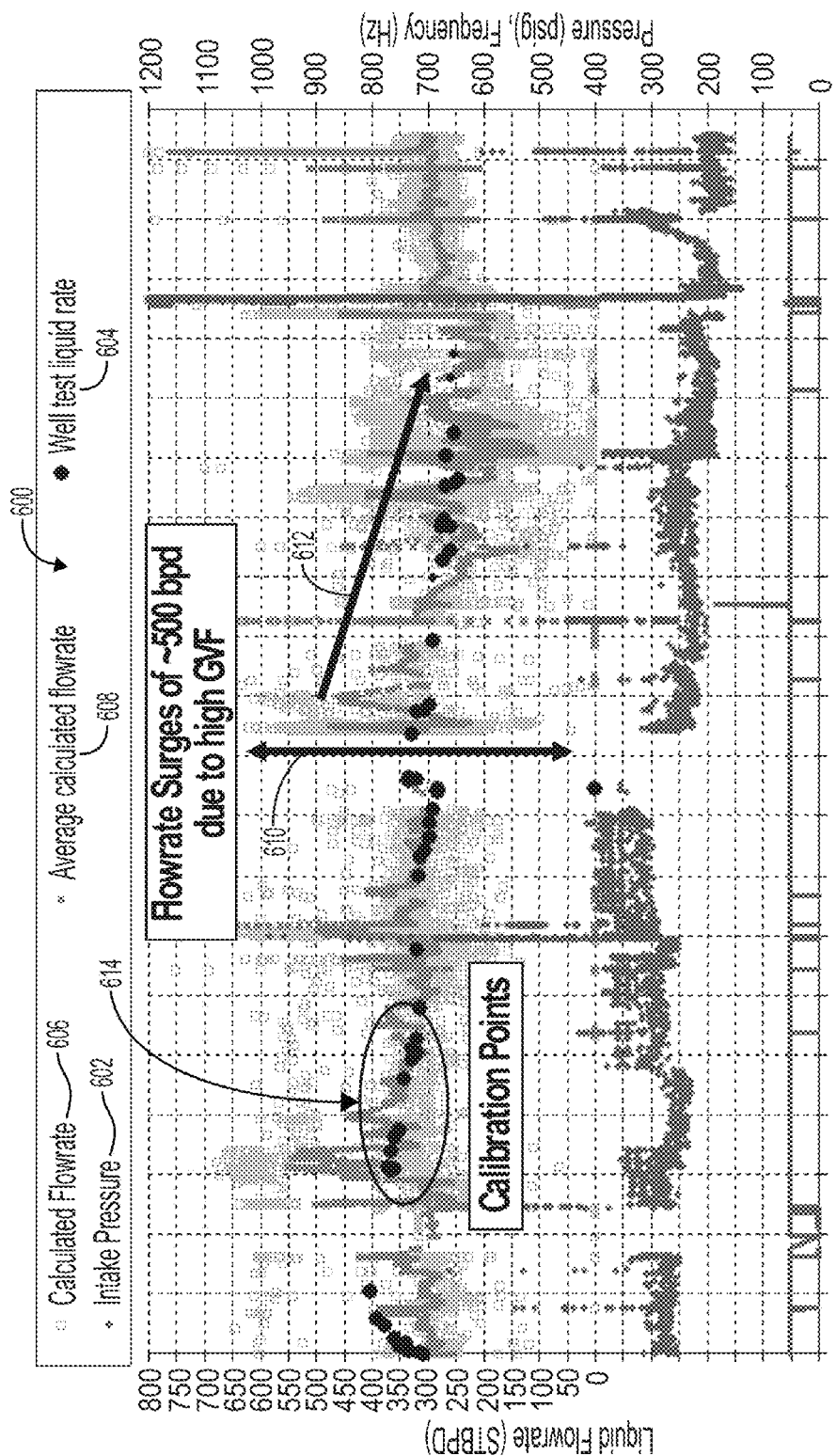
FIG. 7 is an exemplary graph depicting measured and calculated flow rates with instantaneous surging due to high free gas content in the pump.

FIG. 7 is an exemplary graph 600 depicting measured intake pressure 602 and ESP flow rate 604 as well as the calculated flow rate log 606 and an average calculated flow rate 608. Features to be noted in the graph 600 are that when the calculated flow rate log 606 is averaged with a moving average filter (producing 608) there is a high degree of matching between the measured ESP flow rates 604 and the average calculated flow 608, particularly after the algorithm is calibrated over a series of flow rate measurements 614. It should be noted that after the calibration of the algorithm with the flow rate measurements 614, a high degree of matching is visible between the average calculated flow rates 608 and the measured flow rates 604. This is a product of the fact that the currently disclosed method is an analytical model which is valid at all times and is a technique which captures the transients due to handling compressible fluids such as high free gas content. The domain of validity therefore extends beyond the calibration period, so long as the physical properties of the ESP remain generally the same.

Additionally, the calculated flow rate 606 shows a wide variability 610 that is not shown in any of the measured ESP flow rates 604. The high degree of variability of nearly 500 barrels per day found in the calculated flow log 606 reflects instantaneous surges in the pump due to GVF in the well. Therefore, an advantageous feature of the systems and methods as disclosed herein is the measurement of flow rate surges due to high GVF that are undetectable by standard ESP flow rate measurement techniques.

Various alternatives and embodiments are contemplated as being within the scope of the following claims particularly pointing out and distinctly claiming the subject matter regarded as the invention.

What is claimed is:

1. A system for monitoring the flow of liquid in a well, the system comprising:
    an electric submersible pump (ESP) having a motor and positioned within a well completion;
    a surface switchgear electrically coupled to the ESP, wherein the surface switchgear provides the electricity to drive the ESP;
    an intake pressure gauge coupled to the ESP, the intake pressure gauge measures an intake pressure;
    a discharge pressure gauge coupled to the ESP, the discharge pressure gauge measures a discharge pressure;
    a volt meter coupled to the surface switchgear, the volt meter measures a voltage of the motor;
    an ammeter coupled to the surface switchgear, the ammeter measures a current of the motor;
    a frequency transducer that measures a frequency of the surface switchgear;
    a non-transitory computer readable medium containing computer instructions stored therein for causing a computer processor to perform; and
    a computer processor that executes the computer instructions that upon execution causes the processor to receive values representing the measured intake pressure, discharge pressure, voltage of the motor, current of the motor, and frequency of the surface switchgear, and the processor calculates a flow rate through the ESP by applying the received values to a power equilibrium equation based upon the ESP.

2. The system of claim 1, wherein the surface switchgear is a variable speed drive (VSD); and
    the computer instructions further causes the processor to calculate an efficiency to flow rate ratio using the power equilibrium equation.

3. The system of claim 2, wherein the computer instructions further causes the processor to obtain a non-dimension flow rate by applying the efficiency to flow rate ratio to a function relating efficiency to flow rate ratio to non-dimensional flow rate.

4. The system of claim 1, wherein the computer instructions further causes the processor to receive a measured value of flow rate through the ESP and calibrate the flow rate through the ESP calculated by the processor with the received measured flow rate value.

5. The system of claim 1, wherein the computer instructions further causes the processor to receive a static input, to apply the static input to a look up table to obtain a characteristic value of the ESP, and to apply the obtained characteristic value to the power equilibrium equation.

6. A system for monitoring the flow of liquid in a well, the system comprising:
    an electric submersible pump (ESP) having a motor;
    a switchgear electrically coupled to the ESP, wherein the switchgear provides electricity to drive the ESP;
    a non-transitory computer readable medium containing computer instructions stored therein for causing a computer to processor to perform; and
    a computer processor that executes the computer instructions that upon execution causes the processor to receive values of an intake pressure of the ESP, a discharge pressure of the ESP, a voltage of the motor, a current of the motor, and a frequency of the switchgear, and the processor calculates a flow rate through the ESP by applying the received values to a power equilibrium equation based upon the ESP.

7. The system of claim 6 wherein the ESP is positioned within a wellbore and wherein the switchgear is a surface switchgear.

8. The system of claim 7 wherein the surface switchgear is a variable speed drive (VSD); and
    the computer instructions further causes the processor to calculate an efficiency to flow rate ration using the power equilibrium equation.

9. The system of claim 8, wherein the computer instructions further causes the processor to obtain a non-dimensional flow rate by applying the efficiency to flow rate ratio to a function relating efficiency to flow rate ratio to non-dimensional flow rate.

10. The system of claim 6, wherein the computer instructions further causes the processor to receive a measured value of flow rate through the ESP and calibrate the flow rate through the ESP calculated by the processor with the received measured flow rate value.

11. The system of claim 6, wherein the computer instructions further causes the processor to receive a static input, to apply the static input to a look up table to obtain a characteristic value of the ESP, and to apply the obtained characteristic value to the power equilibrium equation.

* * * * *